(12) United States Patent
Ogura et al.

(10) Patent No.: US 7,852,728 B2
(45) Date of Patent: Dec. 14, 2010

(54) DIGITAL SIGNAL REPRODUCING APPARATUS

(75) Inventors: Youichi Ogura, Osaka (JP); Tatsushi Hiraki, Osaka (JP); Yorikazu Takao, Osaka (JP)

(73) Assignee: Panasonic Corporation, Osaka (JP)

( * ) Notice: Subject to any disclaimer, the term of this patent is extended or adjusted under 35 U.S.C. 154(b) by 506 days.

(21) Appl. No.: 11/995,634

(22) PCT Filed: Jul. 20, 2006

(86) PCT No.: PCT/JP2006/314407

§ 371 (c)(1),
(2), (4) Date: Jan. 14, 2008

(87) PCT Pub. No.: WO2007/010994

PCT Pub. Date: Jan. 25, 2007

(65) Prior Publication Data

US 2009/0257334 A1   Oct. 15, 2009

(30) Foreign Application Priority Data

Jul. 20, 2005   (JP) .............................. 2005-209750

(51) Int. Cl.
*G11B 7/00* (2006.01)
(52) U.S. Cl. ................ 369/59.22; 369/59.21; 369/59.11
(58) Field of Classification Search ................ 369/59.22
See application file for complete search history.

(56) References Cited

U.S. PATENT DOCUMENTS

| 5,455,813 | A | 10/1995 | Hayashi |
| 6,104,682 | A | 8/2000 | Konishi |
| 6,963,528 | B2 | 11/2005 | Ogura |
| 2002/0181360 | A1* | 12/2002 | Hamada et al. .......... 369/47.28 |
| 2003/0021208 | A1 | 1/2003 | Ogura |
| 2005/0002306 | A1* | 1/2005 | Urita ...................... 369/59.21 |

FOREIGN PATENT DOCUMENTS

CN   1400597 A   3/2003

(Continued)

OTHER PUBLICATIONS

Chinese Office Action, w/ English translation thereof, issued in Chinese Patent Application No. CN 200680026137.8 dated Mar. 26, 2010.

*Primary Examiner*—Lixi Chow
(74) *Attorney, Agent, or Firm*—McDermott Will & Emery LLP

(57) ABSTRACT

A digital signal reproducing apparatus includes an analog to digital converter for sampling and quantizing a signal read from an optical recording medium in accordance with a reproduced clock having a frequency which is one-half of a channel bit frequency and outputting an obtained digital RF signal, an offset compensation circuit for reducing an offset component in an amplitude direction from the digital RF signal, and a simplified interpolation filter for reconstructing a signal indicating a predetermined pattern recorded in the optical recording medium from the output signal of the offset compensation circuit and outputting the reconstructed signal. A control operation is performed to reduce the magnitudes of respective values shown by first phase error information on a section with the predetermined pattern and by second phase error information on a section other than the section with the predetermined pattern.

12 Claims, 9 Drawing Sheets

FOREIGN PATENT DOCUMENTS

| | | |
|---|---|---|
| JP | 05-094665 | 4/1993 |
| JP | 05-274797 | 10/1993 |
| JP | 06-195892 | 7/1994 |
| JP | 2000-100083 | 4/2000 |
| JP | 2000-200467 | 7/2000 |
| JP | 2003-036612 | 2/2003 |

* cited by examiner (a)

(b)

(a)

(b)

(a)

(b)

(a)

(b)

(a)

(b)

DIGITAL SIGNAL REPRODUCING APPARATUS

RELATED APPLICATIONS

This application is the U.S. National Phase under 35 U.S.C. §371 of International Application No. PCT/JP2006/314407, filed on Jul. 20, 2006, which in turn claims benefit of Japanese Application No. 2005-209750, filed on Jul. 20, 2005, the disclosure of which Applications are incorporated by reference herein.

TECHNICAL FIELD

The present invention relates to an apparatus for performing signal processing to record digital data in an optical recording medium and reproduce digital data from an optical recording medium.

BACKGROUND ART

As a system for recording digital data in an optical recording medium (optical disk), a system which implements a uniform recording density over the recording medium by holding a linear velocity constant, such as a CD (Compact Disc (registered trademark)) or a DVD (Digital Versatile Disk), is mostly used. In recent years, attention has been focused not only on a read-only optical disk but also on a recordable DVD-RAM (DVD-Random Access Memory), a once-writable DVD-Recordable (hereinafter referred to as DVD-R), and a rewritable DVD-Rewritable (hereinafter referred to as DVD-RW). Because the DVD-RAM disk has a characteristic feature of enabling recording/reproduction by random access, it is appropriate as an information recording medium.

The DVD-RAM disk has a plurality of unit blocks (sectors) each having headers in which address information and the like are written as embossed pits and a data portion in which digital data is actually recorded. In the headers and the data portion, a pull-in pattern (hereinafter referred to as a VFO pattern) configured to have a single frequency component is present. In a circuit for processing a reproduced signal, phase pull-in is performed on a per sector basis.

A phase locked loop (PLL) is known for performing the process, which reproduces a clock by switchingly using a phase error in an area with the VFO pattern and a phase error in an area where normal data is recorded and synchronizes the reproduced clock with the reproduced signal read from the DVD-RAM disk (see, e.g., Patent Document 1).

As a recording/reproduction speed increases, cost and power consumption increase with an increase in circuit scale. As one of methods which suppress the increasing cost and power consumption, there is known a method which sets the frequency of the reproduced clock to one-half of a channel bit frequency and performs sampling in synchronization with the reproduced clock in an analog to digital converter (see, e.g., Patent Document 2).

Patent Document 1: Japanese Laid-Open Patent Publication No. 2000-200467
Patent Document 2: Japanese Laid-Open Patent Publication No. 2003-36612

DISCLOSURE OF THE INVENTION

Problem to be Solved by the Invention

However, in the case of performing recording/reproduction at a high speed, the frequency of the reproduced clock increases so that power consumption increases. Moreover, the number of stages of logic gates capable of performing arithmetic operations in one period of the reproduced clock decreases so that pipeline processes and control delays increase. As a result, the circuit scale increases to increase cost and the PLL for generating the reproduced clock becomes unstable to degrade recording/reproduction performance. In addition, phase locking required for reproduction (intermittent reproduction) performed on a per sector basis in a DVD-RAM disk or the like cannot be implemented by merely setting the frequency of the reproduced clock to one-half of the channel bit frequency.

It is therefore an object of the present invention to reduce the circuit scale and power consumption of an apparatus for performing high-speed recording or reproduction of digital data with respect to an optical recording medium.

Means for Solving the Problems

A digital signal reproducing apparatus according to the present invention includes: an analog to digital converter for sampling and quantizing a reproduced RF (Radio Frequency) signal read from an optical recording medium in which address information is intermittently recorded as embossed pits and a recording groove has a wobble in accordance with a reproduced clock having a frequency which is one-half of a channel bit frequency and outputting an obtained digital RF signal; an offset compensation circuit for reducing an offset component in an amplitude direction from the digital RF signal and outputting the digital RF signal with the reduced offset component in the amplitude direction; a simplified interpolation filter for reconstructing a signal indicating a predetermined pattern recorded in the optical recording medium from the output signal of the offset compensation circuit and outputting the reconstructed signal; a first phase error detection circuit for obtaining a phase error in a section with the predetermined pattern in accordance with the output signal of the offset compensation circuit and an output signal of the simplified interpolation filter and outputting the phase error as first phase error information; a second phase error detection circuit for obtaining a phase error in a section other than the section with the predetermined pattern in accordance with the output signal of the offset compensation circuit and outputting the phase error as second phase error information; a smoothing filter for setting a feedback gain to each of respective values shown by the first phase error information and the second phase error information to reduce a magnitude of each of the values, obtaining a product of each of the values and the feedback gain corresponding thereto, smoothing a result, and outputting the smoothed result; and a clock generation circuit for generating the reproduced clock in accordance with the output signal of the smoothing filter.

The arrangement allows a reproduced clock having a frequency lower than a channel bit frequency to be stably obtained. As a result, it becomes easy to perform high-speed recording or reproduction of digital data with respect to an optical recording medium.

Effect of the Invention

Since the present invention allows the use of a reproduced clock having a low frequency, the circuit scale and power consumption of an apparatus for performing high-speed recording or reproduction with respect to an optical recording medium can be reduced. As a result, it is possible to achieve a reduction in circuit cost and implement stable phase locking.

DESCRIPTION OF NUMERALS

Figure 1:
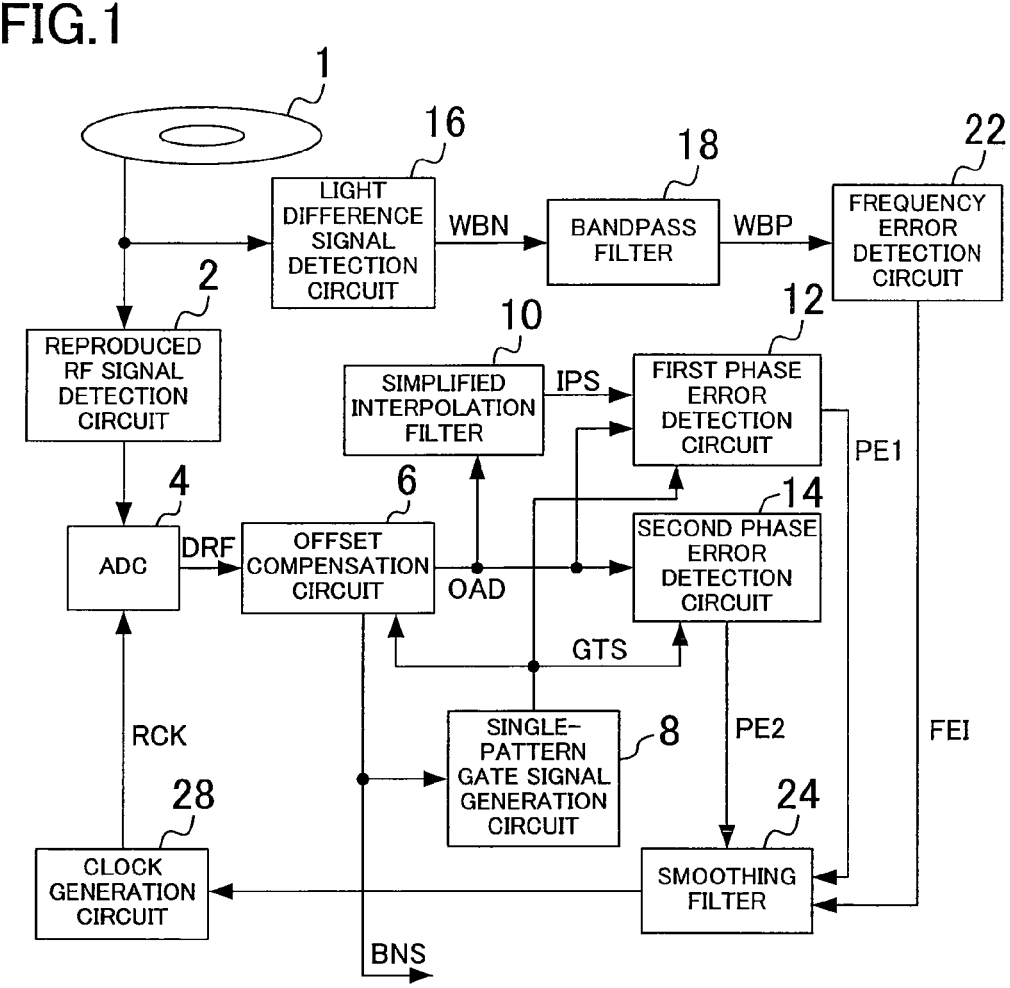
FIG. 1 is a block diagram showing a structure of a digital signal reproducing apparatus according to a first embodiment of the present invention.

4 Analog to Digital Converter
6 Offset Compensation Circuit
8 Single-Pattern Gate Signal Generation Circuit
10 Simplified Interpolation Filter
12, 212 First Phase Error Detection Circuit
14 Second Phase Error Detection Circuit
18 Bandpass Filter
22 Frequency Error Detection Circuit
24 Smoothing Filter
28 Clock Generation Circuit
32 Power Control Unit
33 Power Gate Signal Generation Circuit
34 Power Stop Circuit
36 Partial Response Equalizer
37 Nyquist Interpolation Filter
38 Maximum Likelihood Decoder
61, 261 Rising Edge Detection Circuit (Zero Cross Decoder)
62, 262 Cycle Counter
63, 263 Phase Error Information Determination Circuit
70 Moving Average Filter
75 Binarization Circuit
76 Lowpass Filter
77 D Flip-Flop
78 Adder
266 Sampling Selection Circuit

BEST MODE FOR CARRYING OUT THE INVENTION

Referring to the drawings, each of the embodiments of the present invention will be described hereinbelow in detail.

Embodiment 1

FIG. 1 is a block diagram showing a structure of a digital signal reproducing apparatus according to the first embodiment of the present invention. The digital signal reproducing apparatus of FIG. 1 includes a reproduced RF signal detection circuit 2, an analog to digital converter (hereinafter referred to as ADC) 4, an offset compensation circuit 6, a single-pattern gate signal generation circuit 8, a simplified interpolation filter 10, a first phase error detection circuit 12, a second phase error detection circuit 14, a light difference signal detection circuit 16, a bandpass filter 18, a frequency error detection circuit 22, a smoothing filter 24, and a clock generation circuit 28. The digital signal reproducing apparatus of FIG. 1 is used not only in the case of performing reproduction from a DVD-RAM disk 1 as an optical recording medium but also in the case of performing recording in the DVD-RAM disk 1.

To the reproduced RF signal detection circuit 2, a signal read from the DVD-RAM disk 1 as the optical recording medium by an optical pick-up (not shown) is inputted. A photodetector in the optical pick-up converts the intensity of light reflected from the DVD-RAM disk 1 to an electric signal and outputs the electric signal to the reproduced RF signal detection circuit 2. The reproduced RF signal detection circuit 2 is, e.g., a high-order equal ripple filter to which a boost amount and a cur-off frequency can be set arbitrarily. The reproduced RF signal detection circuit 2 performs compensation which enhances an high-frequency component attenuated by intersymbol interference with respect to the inputted signal, removes a noise component present in a band other than that of a recorded signal, and outputs an obtained result as a reproduced RF signal to the ADC 4, thereby achieving an improvement in jitter.

Figure 2:
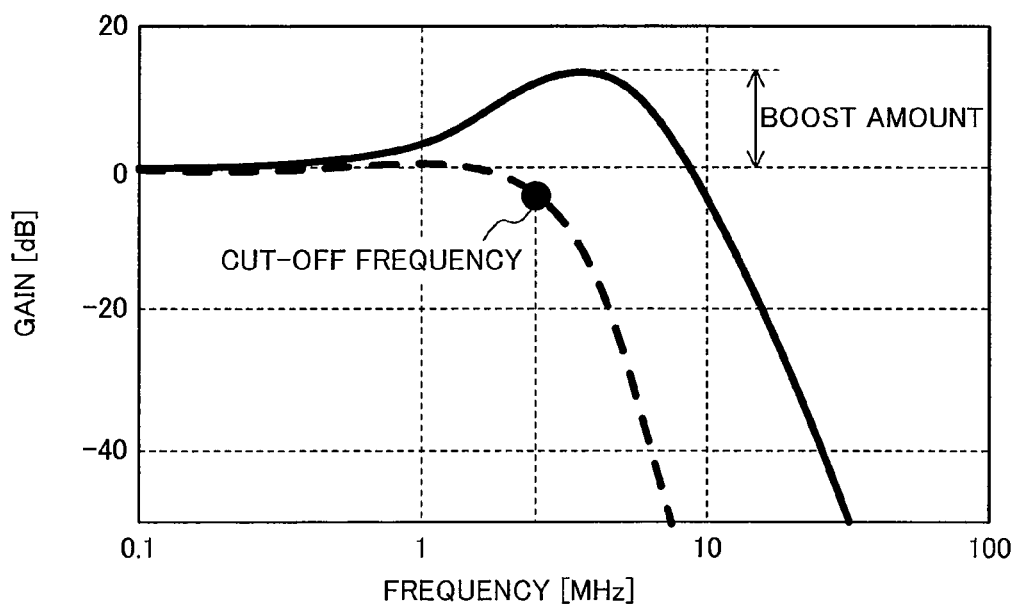
FIG. 2 is a characteristic view showing a characteristic of an equal ripple filter used as the reproduced RF signal detection circuit of FIG. 1.

FIG. 2 is a characteristic view showing a characteristic of the equal ripple filter used as the reproduced RF signal detection circuit 2 of FIG. 1. In FIG. 2, the dotted line indicates a characteristic of a signal inputted to the equal ripple filter and the solid line indicates a characteristic of an output signal of the equal ripple filter. In the filter, a high-frequency boost as indicated by the solid line is performed.

The ADC 4 samples and quantizes the reproduced RF signal with the timing of a reproduced clock RCK and outputs a multi-bit digital RF signal DRF obtained to the offset compensation circuit 6. The frequency of the reproduced clock RCK is one-half of a channel bit frequency.

Figure 3:
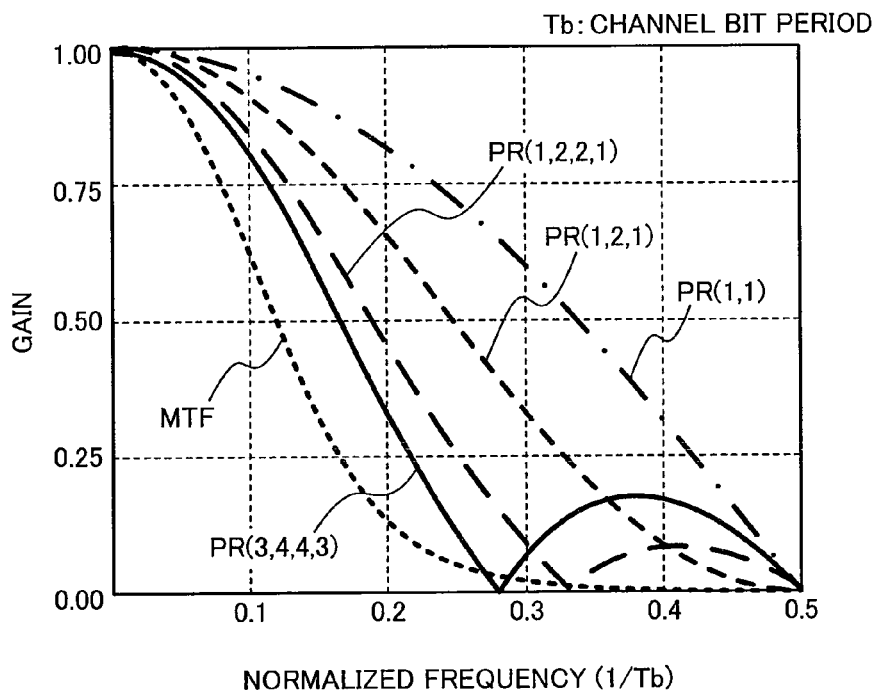
FIG. 3 is a characteristic view showing frequency responses including a MTF (Mutual Transfer Function)

FIG. 3 is a characteristic view showing frequency responses of a MFT (Mutual Transfer Function) and the like. It is assumed that a recording code (code of which a minimum run length is limited to 2) having a restriction that at least three consecutive bits have the same value such as, e.g., a 8-16 modulation code used in a DVD-RAM is used and the MTF response as an optical reproduction characteristic is distributed in a band where frequencies are not more than approximately ¼ of a channel bit frequency 1/Tb (i.e., not more than approximately 0.25 of a normalized frequency where Tb is the channel bit period), as shown in FIG. 3. In this case, it is possible to demodulate a read signal when the ADC 4 performs sampling using the reproduced clock RCK having a frequency which is one-half of the channel bit frequency. This is shown by a sampling theorem.

Figure 4:
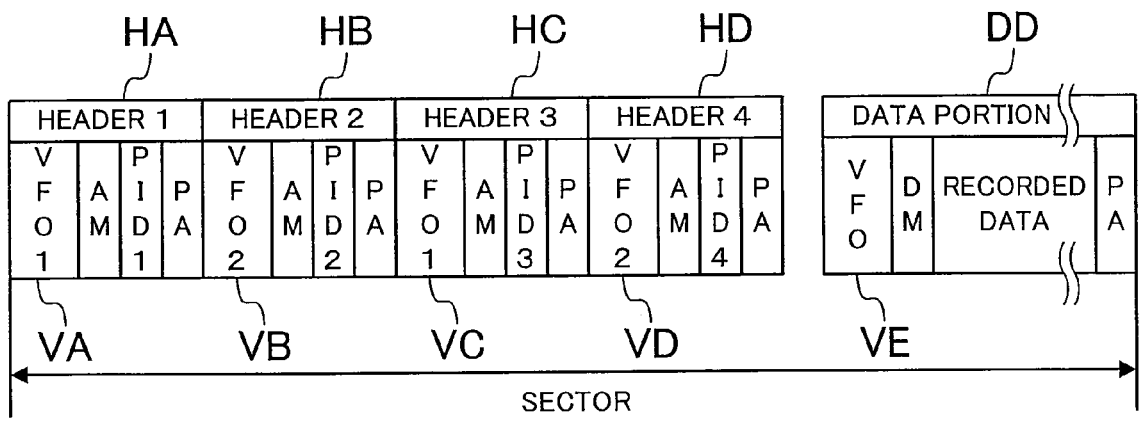
FIG. 4 is a view illustrating a data structure in a DVD-RAM disk.

FIG. 4 is a view illustrating a data structure in the DVD-RAM disk 1. The DVD-RAM disk 1 has a plurality of sectors. As shown in FIG. 4, each of the sectors has headers HA, HB, HC, and HD and a data portion DD. In the headers HA to HD, address information is recorded as embossed pits, while any data is recorded in the data portion DD by a user. In the DVD-RAM disk 1, a recording groove has a wobble.

The headers HA to HD and the data portion DD have VFO pattern regions VA, VB, VC, VD, and VE at the respective heads thereof. In the VFO pattern regions VA to VE, a predetermined VFO pattern is repeatedly recorded. In the VFO pattern, four consecutive bits have the same value (length 4 Tb (Tb is the channel bit period)) and the subsequent four bits have the same value different from the value of the preceding four bits.

Figure 5:
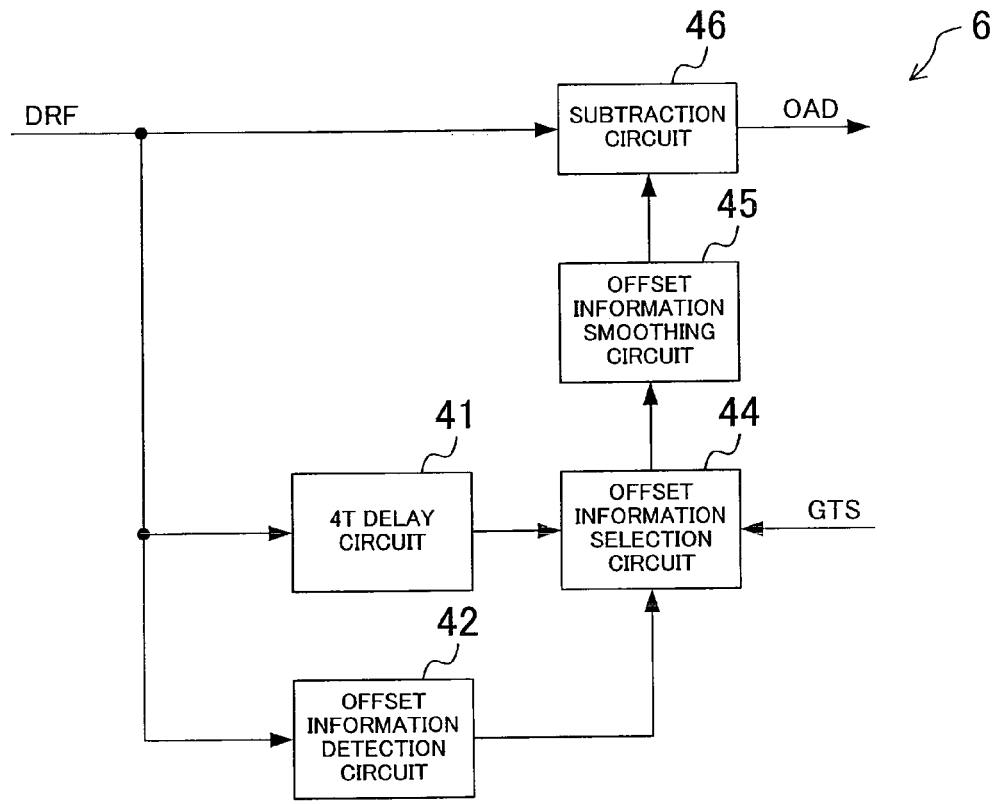
FIG. 5 is a block diagram showing an example of a structure of the offset compensation circuit of FIG. 1.

FIG. 5 is a block diagram showing an example of a structure of the offset compensation circuit 6 of FIG. 1. The offset compensation circuit 6 has a 4 T delay circuit 41, an offset information detection circuit 42, an offset information selection circuit 44, an offset information smoothing circuit 45, and a subtraction circuit 46.

The 4 T delay circuit 41 delays the digital RF signal DRF by 4 Tb (corresponding to two cycles of the reproduced clock RCK) and outputs the delayed digital RF signal DRF to the offset information selection circuit 44. The offset information detection circuit 42 detects offset information in an amplitude direction from the digital RF signal DRF and outputs the result of the detection to the offset information selection circuit 44.

The offset information detection circuit 42 determines mid points (interpolated signals) between points at which the digital RF signal is sampled (sampled signals) by linear interpolation, selects those of the sampled signals and the interpolated signals which are present at zero cross positions, and smoothes the selected signals to obtain offset information. This is merely an example, and the offset information detection circuit 42 may also be adapted to obtain offset information with another structure.

The offset information selection circuit 44 selects an output of the 4 T delay circuit 41 when a single-pattern gate signal GTS indicates any of sections each with the VFO pattern (VFO pattern regions VA to VE) and selects an output of the offset information detection circuit 42 when the single-pattern gate signal GTS indicates a section other than the sections each with the VFO pattern and outputs the selected output to the offset information smoothing circuit 45. The offset information smoothing circuit 45 smoothes an output signal of the offset information selection circuit 45 with an accumulator or the like and outputs the smoothed output signal to the subtraction circuit 46. The subtraction circuit 46 subtracts the output signal of the offset information smoothing circuit 45 from the digital RF signal DRF and outputs the result of the subtraction as a signal OAD.

Thus, the offset compensation circuit 46 reduces the offset component in the amplitude direction included in the digital RF signal DRF and outputs the digital RF signal DRF with the reduced offset component. The offset compensation circuit 6 also binarizes the signal OAD using a predetermined threshold value and outputs a digital binarized signal BNS obtained, though not shown in FIG. 5.

In the DVD-RAM disk 1, it is preferable that intermittent reproduction is implemented on a per sector basis by effectively using the VFO pattern in each of the VFO pattern regions VA to VE for phase locking and offset compensation in the amplitude direction. For the phase locking and the offset control, the single-pattern gate signal GTS for discerning the VFO pattern regions VA to VE is needed.

The single-pattern gate signal generation circuit 8 recognizes the VFO pattern from the digital binarized signal BNS outputted from the offset compensation circuit 6 and asserts the single-pattern gate signal GTS in any of the sections each with the VFO pattern, while negating the single-pattern gate signal GTS in the section other than the sections each with the VFO pattern. The single-pattern gate signal generation circuit 8 may also have a counter for performing counting in a section corresponding to one sector based on address information obtained from the digital binarized signal BNS, estimate the positions of the VFO pattern regions VA to VE in the next sector, and assert the single-pattern gate signal GTS in these regions. Alternatively, for stable phase locking and offset compensation, the single-pattern gate signal generation circuit 8 may also assert the single-pattern gate signal GTS in the VFO regions VA, VC, and VE, while not asserting the single-pattern gate signal GTS in the VFO pattern regions VB and VD.

Figure 6:
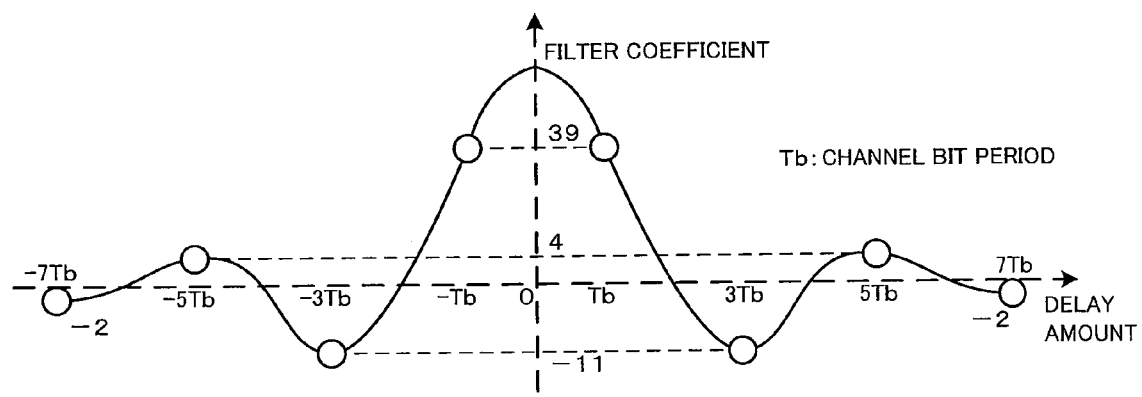
FIG. 6 is a view illustrating an example of the filter coefficient of a finite impulse response filter.

FIG. 6 is a view illustrating an example of the filter coefficient of a finite impulse response filter. The simplified interpolation filter 10 reconstructs information that is missing due to the frequency of the reproduced clock RCK which is one-half of the channel bit frequency to reconstruct a signal indicating the VFO pattern. The simplified interpolation filter 10 is a finite impulse response filter having a filter coefficient as shown in FIG. 6, which is ideally a filter capable of reconstructing a signal in a Nyquist band. However, to implement high-speed phase locking, it is indispensable to generate phase error information in a short time. Therefore, the simplified interpolation filter 10 is constructed as follows.

Figure 7:
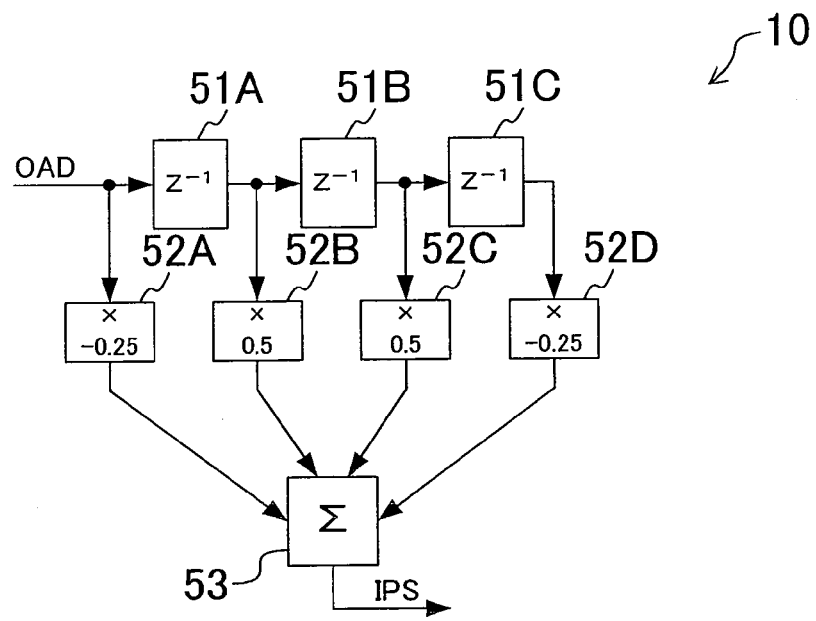
FIG. 7($a$) is a block diagram showing a structure of a simplified interpolation filter of FIG. 1 and FIG. 7($b$) is a characteristic view showing the frequency response of the simplified interpolation filter of FIG. 7($a$)
Figure 7:
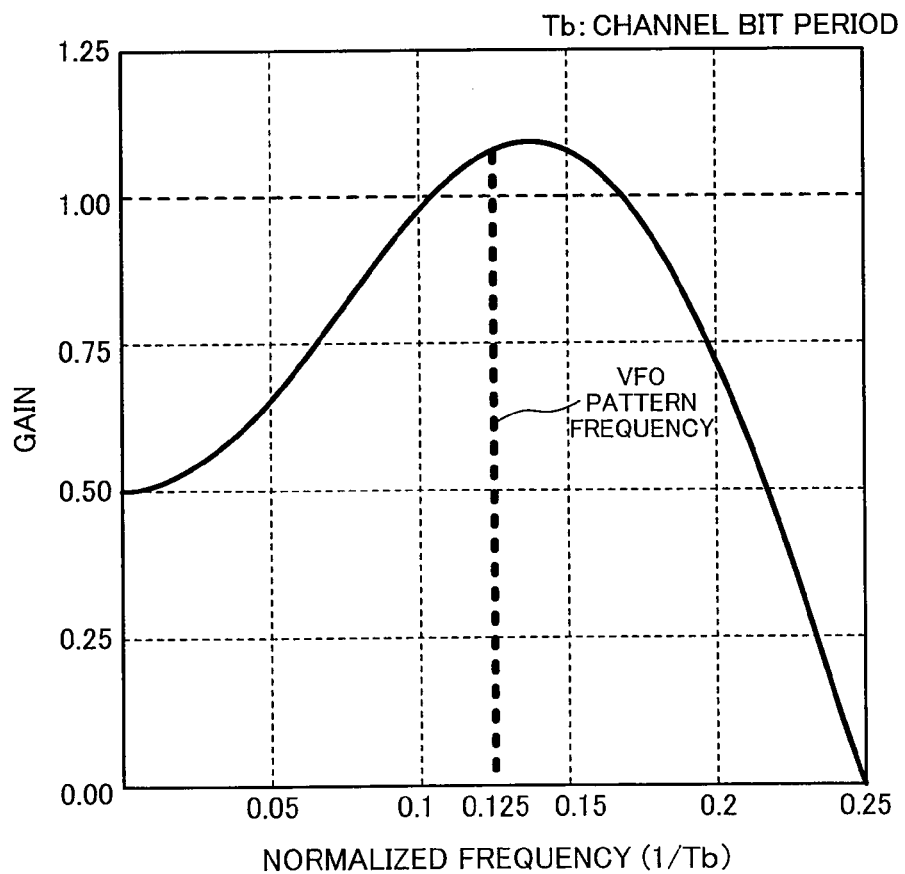

FIG. 7(a) is a block diagram showing a structure of the simplified interpolation filter 10 of FIG. 1. FIG. 7(b) is a characteristic view showing the frequency response of the simplified interpolation filter 10 of FIG. 7(a). The simplified interpolation filter 10 has delay circuits 51A, 51B, and 51C, bit shifters 52A, 52B, 52C, and 52D, and an adder 53.

The delay circuit 51A delays the output signal OAD of the offset compensation circuit 6 by 2 Tb and outputs the delayed output signal OAD. The delay circuit 52A delays the output of the delay circuit 51A by 2 Tb and outputs the delayed output. The delay circuit 53A delays the output of the delay circuit 52A by 2 Tb and outputs the delayed output. The time 2 Tb is the period of the reproduced clock RCK. The bit shifters 52A to 52D weigh the signal OAD and the outputs of the delay circuits 52A to 52C with the filter coefficients (−0.25, 0.5, 0.5, and −0.25). The adder 53 adds up output signals of the bit shifters 52A to 52D and outputs the result of the addition as a signal IPS.

Thus, the simplified interpolation filter 10 constitutes a 4-tap finite impulse response filter and is valid with respect to a signal in which the same values continue each for a duration of 4 Tb, as in the VFO pattern regions VA to VE. One period of the VFO pattern is 8 Tb, i.e., the VFO pattern has a frequency component of which the frequency is ⅛ of the channel bit frequency. With the simplified interpolation filter 10, a low-frequency component is suppressed and the amplitude can be reconstructed to a nearly 1-fold level at a normalized frequency of 0.125 which is normalized by the channel bit frequency. Accordingly, the simplified interpolation filter 10 can reconstruct the signal indicating the VFO pattern with excellent accuracy.

Therefore, the accuracy of phase error information PE1 detected by the first phase error generation circuit 12 can be improved and the loop delay of the PLL can be reduced. As a result, the performance of phase locking is stabilized and reproduction performance can be improved.

Figure 8:
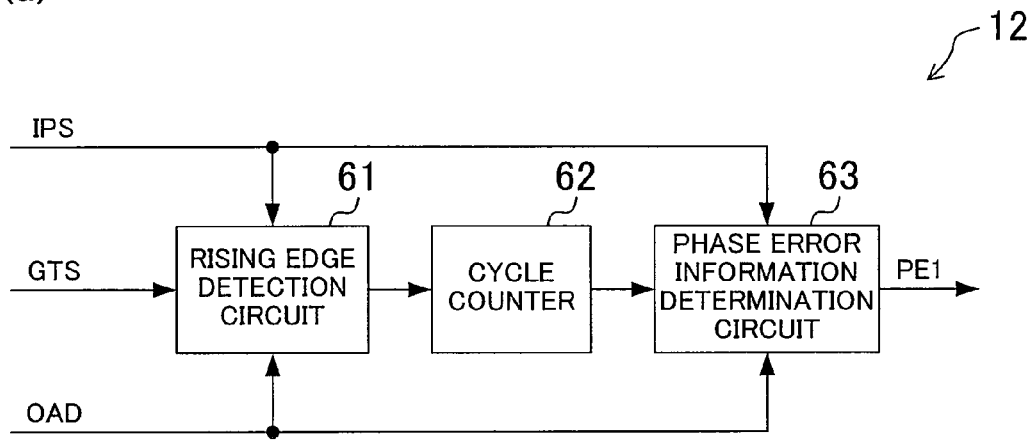
FIG. 8($a$) is a block diagram showing an example of a structure of the first phase error detection circuit of FIG. 1 and FIG. 8($b$) is view illustrating the principle of the detection of phase error information by the first phase error detection circuit of FIG. 8($a$)
Figure 8:
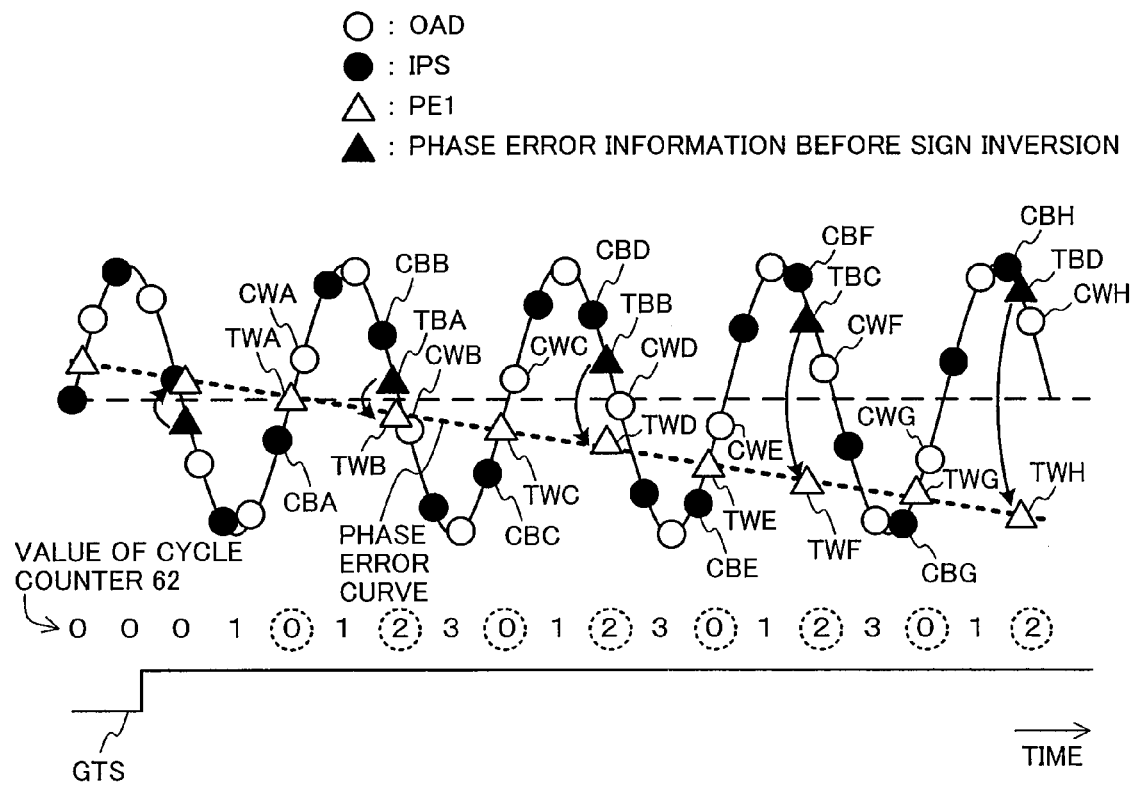

FIG. 8(a) is a block diagram showing an example of a structure of the first phase error detection circuit 12 of FIG. 1. FIG. 8(b) is view illustrating the principle of the detection of phase error information PE1 by the first phase error detection circuit 12 of FIG. 8(a). When the single-pattern gate signal GTS indicates any of the sections each with the VFO pattern, the first phase error detection circuit 12 detects continuous phase error information PE1 from the output signal of the simplified interpolation filter 10 and from the output signal of the offset compensation circuit 6 by using the characteristic of the VFO pattern. A description will be given hereinbelow to an example of the first phase error detection circuit 12. In the following description, the first phase error detection circuit 12 may also have a structure different from that shown in FIG. 8(a).

As shown in FIG. 8(a), the first phase error detection circuit 12 has a rising edge detection circuit 61 as a zero cross detector, a cycle counter 62, and a phase error information determination circuit 63. The rising edge detection circuit 61 receives the output signal IPS of the simplified interpolation filter 10 and the output signal OAD of the offset compensation circuit 6 and detects the zero cross position of a first rise when the single-pattern gate signal GTS indicates any of the sections each with the VFO pattern.

In FIG. 8(b), the points CWA and the like (represented by the white circles ○) indicate the values of the output signal OAD of the offset compensation circuit 6 and the points CBA and the like (represented by the black circles ●) indicate the values of the output signals IPS of the simplified interpolation filter 10. When these points indicating these values are arranged in a temporal order, the rising edge detection circuit 61 detects among these points the first point of points with a positive value subsequent to a point with a negative value after the single-pattern gate signal GTS shifts to a high logic level, i.e., the zero cross position (point CWA) of the first rise. The points CBA and the like show values at times shifted from those of the points CWA and the like each by one-half of the period of the reproduced clock RCK.

The cycle counter 62 is reset to zero at the detected zero cross position, counts each pulse of the reproduced clock RCK, and circulates the counted value in the order of 0→1→2→3→0.

The phase error information determination circuit 63 outputs a signal obtained by averaging the output signal IPS of the simplified interpolation filter 10 and the output signal OAD of the offset compensation circuit 6 as the phase error information PE1 with the timing with which the counted value of the cycle counter 62 is "0". In FIG. 8(b), the phase error information determination circuit 63 determines the mid point TWA between the point CWA and the point CBA, the mid point TWC between the point CWC and the point CBC, the mid point TWE between the point CWE and the point CBE, and the mid point TWG between the point CWG and the point CBG as points which should be located at the zero cross points of rises and outputs the mid points TWA, TWC, TWE, and TWG (represented by the hollow triangles) as the phase error information PE1.

The phase error information determination circuit 63 inverts the sign of the average value between the value of the output signal IPS of the simplified interpolation filter 10 and the value of the output signal OAD of the offset compensation circuit 6 with the timing with which the counted value of the cycle counter 62 is "2" and outputs the sign-inverted average value as the phase error information PE1. In FIG. 8(b), the phase error information determination circuit 63 determines the mid point TBB between the point CWB and the point CBB, the mid point TBD between the point CWD and the point CBD, the mid point TBF between the point CWF and the point CBF, and the mid point TBH between the point CWH and the point CBH as points which should be located at the zero cross positions of falls, inverts the signs of the respective values of the mid points TBB, TBD, TBF, and TBH (represented by the solid triangles), and outputs the sign-inverted mid points TWB, TWD, TWF, and TWH (represented by the hollow triangles) as the phase error information PE1.

In each of the VFO pattern regions VA to VE, the zero cross position inevitably occurs every 4 Tb, so that it is possible to continuously obtain the points of the phase error information PE1. The phase error signal PE1 thus detected can be shown as a phase error curve as indicated by the broken line of FIG. 8(b). Since the phase error curve has linearity even when the phase error is large, it becomes possible to improve a pull-in speed and enlarge a capture range when phase locking is performed to reduce the phase error to zero. In particular, it is possible to stabilize reproduction performance during intermittent reproduction.

In the case of using a pattern in which the same values continue each for a duration of 6 Tb instead of the pattern in which the same values continue each for a duration of 4 Tb, the zero cross position occurs every 6 Tb. In this case, it is appropriate to cause the cycle counter 62 to repeat the counted value in the order of 0→1→2→3→4→5→0 and cause the phase error information determination circuit 63 to obtain the phase error information PE1 with the timing with which the counted value is "0" and "3" in a similar manner.

The second phase error detection circuit 14 generates phase error information PE2 based on the output signal OAD of the offset compensation circuit 6 and outputs the phase error information PE2 to the smoothing filter 24 when the single-pattern gate signal GTS indicates the section other than the sections each with the VFO pattern. At this time, the second phase error detection circuit 14 outputs the near-zero value of the output signal OAD of the offset compensation circuit 6 as it is on a rise, and inverts the sign of the value and then outputs the inverted-sign value on a fall, each as the phase error information PE2.

In performing recording/reproduction with respect to the DVD-RAM disk 1, when the frequency of the reproduced clock RCK is largely different from the frequency of the reproduced RF signal immediately after conducting a seek, it is necessary to pull down the frequency of the reproduced clock RCK to one-half of the frequency of the clock component of the reproduced RF signal by frequency control. Because the DVD-RAM disk 1 may be in an unrecorded state where data is not recorded in the data portion DD thereof, it is preferable that period information is obtained from a wobble (of which one period corresponds to 186 Tb) formed along the recording groove of the DVD-RAM disk 1.

The light difference detection circuit 16 detects period information from the wobble by using the photodetector in the optical pick-up. The photodetector is divided into four parts by a track direction axis extending in a digital-data recording direction and a radial direction axis orthogonally crossing the track direction axis. The light difference signal detection circuit 16 performs the additions of respective values detected by the four parts of the photodetector from light received from the DVD-RAM disk 1 such that the values detected by the respective two parts forming the two pairs which are arranged in the track direction are added up individually on a pairwise basis, and obtains the difference between the two values obtained as a signal indicating a tracking error. The light difference detection circuit 16 further binarizes the signal using the center of the amplitude thereof as a threshold value and outputs the binarized signal as a wobble binarized signal WBN to the bandpass filter 18.

However, the quality of the wobble binarized signal WBN is degraded by large noise or a waveform distortion during high-speed recording and high-speed reproduction. This is why the bandpass filter 18 is used to reduce the noise and the waveform distortion other than the frequency component of the wobble.

Figure 9:
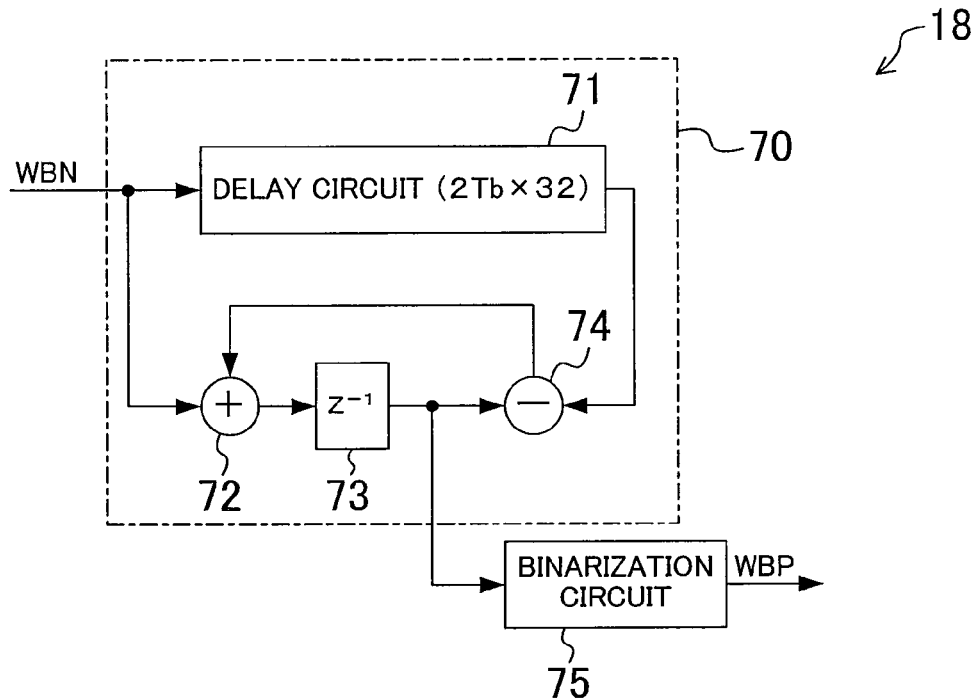
FIG. 9($a$) is a block diagram showing an example of a structure of a bandpass filter of FIG. 1 and FIG. 9($b$) is a characteristic view showing the frequency response of the bandpass filter of FIG. 9($a$)
Figure 9:
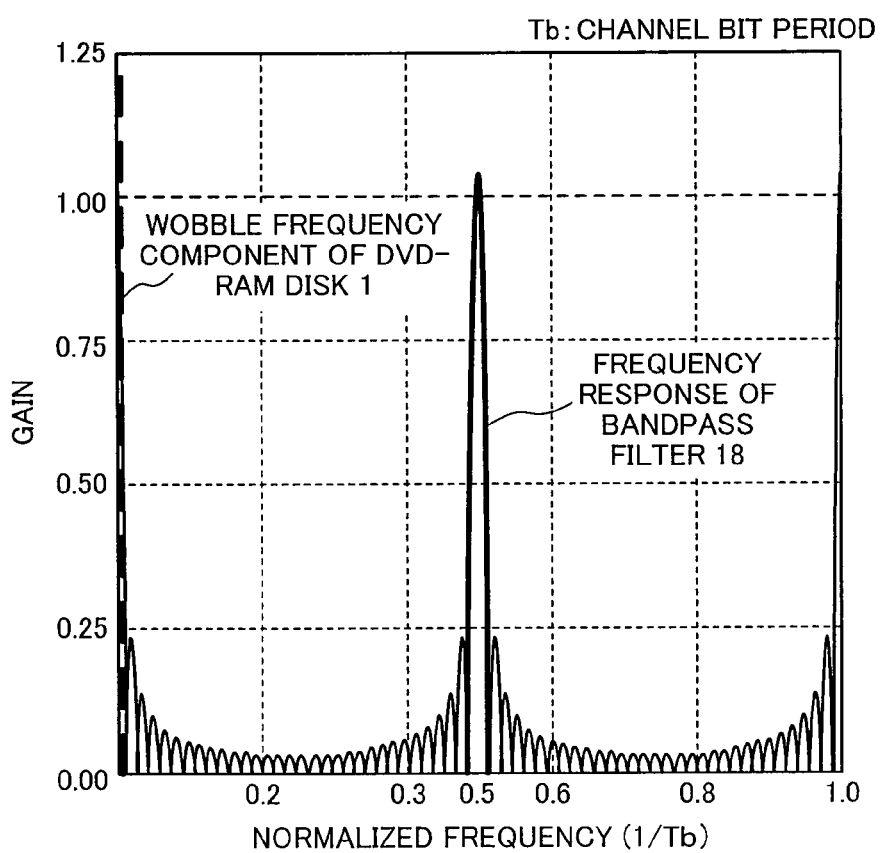

FIG. 9(a) is a block diagram showing an example of a structure of the bandpass filter 18 of FIG. 1. FIG. 9(b) is a characteristic view showing the frequency response of the bandpass filter 18 of FIG. 9(a). As shown in FIG. 9(a), the bandpass filter 18 has a moving average filter 70 and a binarization circuit 75. The moving average filter 70 has delay circuits 71 and 73, an adder 72, and a subtractor 74.

The delay circuit 71 has thirty-two delay elements each for giving a delay of 2 Tb to a signal. These delay elements are connected in series and the delay circuit 71 delays the wobble binarized signal WBN by 64 Tb and outputs the delayed wobble binarized signal WBN. The adder 72 adds up the wobble binarized signal WBN and an output signal of the subtractor 74 and outputs the result of the addition. The delay circuit 73 delays the output of the adder 72 by one period (2 Tb) of the reproduced clock RCK and outputs the delayed output. The subtractor 74 obtains the difference between an output signal of the delay circuit 73 and an output signal of the delay circuit 71 and outputs the difference to the adder 72. The binarization circuit 75 binarizes the output signal by determining the polarity of an output signal of the delay circuit 73, and outputs the binarized output signal as a signal WBP.

As shown in FIG. 9(b), the frequency response of the bandpass filter 18 is such that the frequency components in the vicinity of direct current and normalized frequencies of 0.5 and 1.0 resulting from normalization by the channel bit frequency are allowed to pass, while the other frequency components are attenuated. Since the wobble frequency component is present in the vicinity of a normalized frequency of $1/186$, it can be extracted.

By properly setting the delay given by the delay circuit 71, it is also possible to use the bandpass filter 18 even in an optical recording medium having a different wobble frequency component.

The bandpass filter 18 may also be composed of a finite impulse response filter. It is also possible to drive the delay circuit 71 and the like with a clock at the channel bit frequency which is double the frequency of the reproduced clock RCK. However, in terms of the circuit scale and power consumption, it is more advantageous to compose the bandpass filter 18 of a moving average filter as shown in FIG. 9(a).

By providing such a bandpass filter 18, frequency information can be excellently extracted even when the quality of the wobble binarized signal WBN is degraded by noise. This allows a reduction in frequency pull-in time immediately after a seek and stabilization of frequency control.

Figure 10:
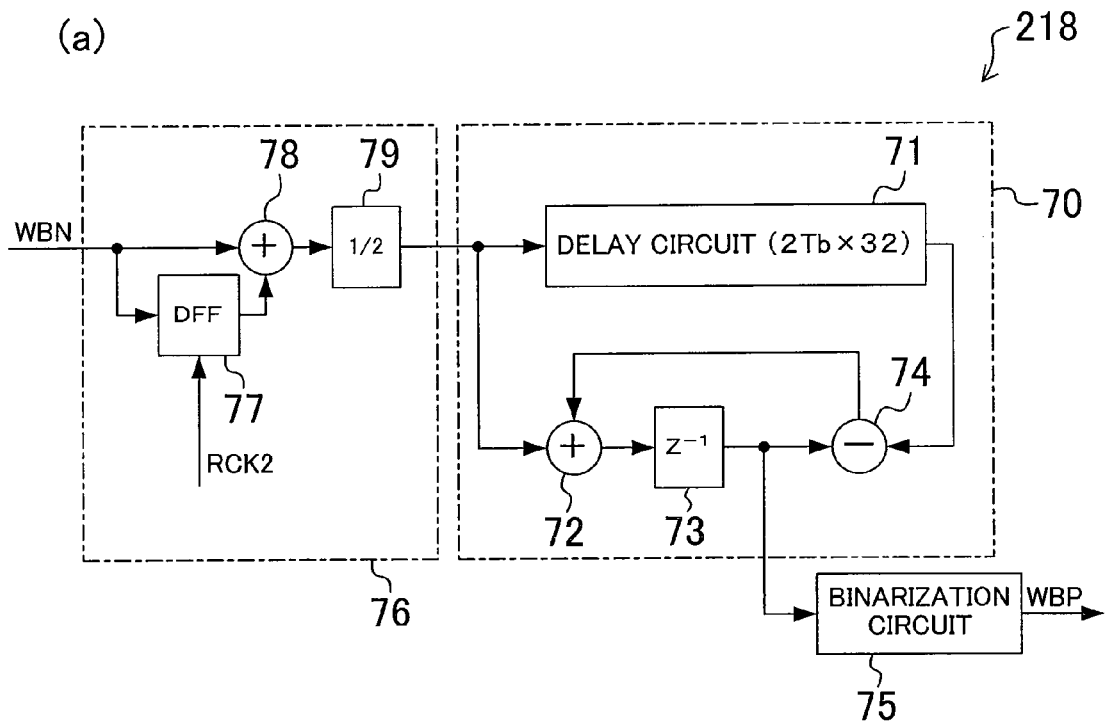
FIG. 10($a$) is a block diagram showing an example of a structure of another bandpass filter and FIG. 10($b$) is a characteristic view showing the frequency response of the bandpass filter of FIG. 10($a$)
Figure 10:
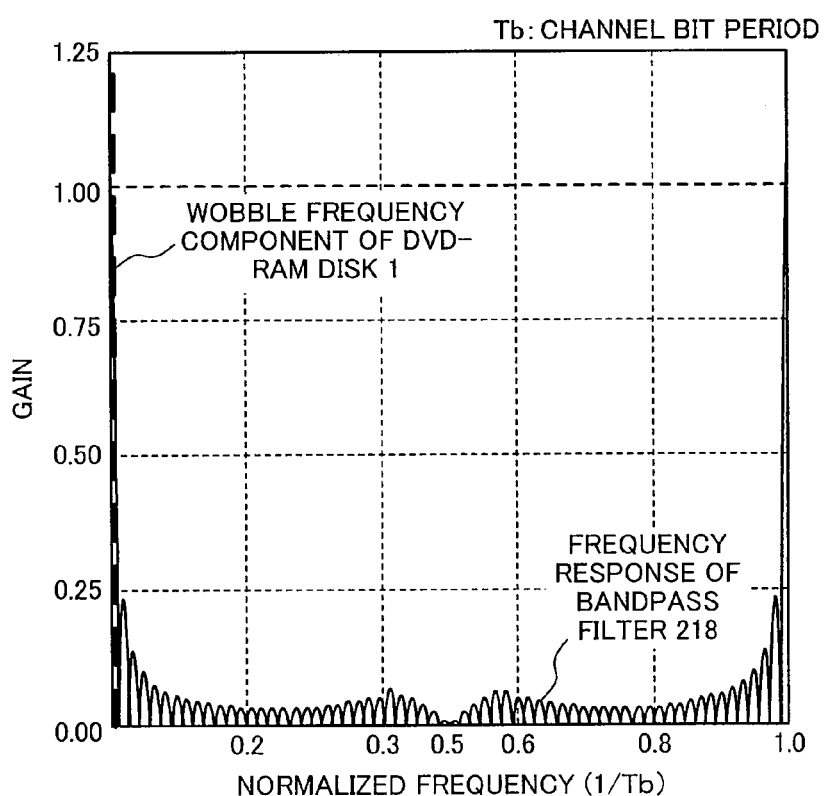

A description will be given to another example of the bandpass filter 18. FIG. 10(a) is a block diagram showing an example of a structure of another bandpass filter 218. FIG. 10(b) is a characteristic view showing the frequency response of the bandpass filter 218 of FIG. 10(a). As shown in FIG. 10(a), the bandpass filter 218 further has a lowpass filter 76 in addition to the components of the bandpass filter 18. The lowpass filter 76 has a D flip-flop (DFF) 77, an adder 78, and a gain element 79.

The DFF 77 delays the wobble binarized signal WBN by 1 Tb with a clock RCK2 having a frequency double the frequency of the reproduced clock RCK. The adder 78 adds up an output signal of the DFF 77 and the wobble binarized signal WBN and outputs the result of the addition. The gain element 79 multiplies an output signal of the adder 78 by ½ and outputs the result of the multiplication to the delay circuit 71 and the adder 72. As for the other components, they are as described with reference to FIG. 9(a).

As shown in FIG. 10(b), the frequency response of the bandpass filter 218 is such that a gain is reduced to a near-zero value in the vicinity of a normalized frequency of 0.5 resulting from normalization by the channel bit frequency. Because the rate of removal of noise from the wobble binarized signal WBN is improved and frequency information can be excellently extracted, it is possible to further reduce the frequency pull-in time immediately after the seek and further stabilize the frequency control.

The frequency error detection circuit 22 measures the period of the output signal WBP of the bandpass filter 18 through counting with the reproduced clock RCK actually obtained. The period of the wobble component is 186 Tb, while the counted value to be obtained is 93 because the period of the reproduced clock RCK in an ideal case is 2 Tb. The frequency error detection circuit 22 obtains the difference between the counted value and the counted value to be obtained and outputs the difference as frequency error information FEI to the smoothing filter 24.

When the obtained counted value is larger than 93, the frequency of the reproduced clock RCK is higher than a desired reproduced clock frequency, so that the frequency error information FEI shows that the frequency of the reproduced clock RCK should be lowered. When the obtained counted value is smaller than 93, the frequency of the reproduced clock RCK is lower than the desired reproduced clock frequency, so that the frequency error information FEI shows that the frequency of the reproduced clock RCK should be increased.

The smoothing filter 24 has the function of allowing a feedback gain to be set to each of the phase error information PE1, the phase error information PE2, and the frequency error information FEI. For example, the smoothing filter 24 is composed of a loop filter having a first-order lag element. The smoothing filter 24 sets a feedback gain to each of respective values shown by the phase error information PE1, the phase error information PE2, and the frequency error information FEI such that the magnitude of each of the values is smaller, obtains a product of each of these values and the corresponding feedback gain, smoothes the result, and outputs the smoothed result.

The clock generation circuit 28 converts an output signal of the smoothing filter 24 to an analog signal, generates the reproduced clock RCK in accordance with the amplitude level of the analog signal through oscillation, and outputs the reproduced clock RCK as a sampling clock to the ADC 4 or the like.

Thus, in the apparatus of FIG. 1, there are a first PLL of the ADC 4→the offset compensation circuit 6→the simplified interpolation filter 10→the first phase error detection circuit 12→the smoothing filter 24→the clock generation circuit 28→the ADC 4, a second PLL of the ADC 4→the offset compensation circuit 6→the second phase error detection circuit 14→the smoothing filter 24→the clock generation circuit 28→the ADC 4, and a frequency locked loop of the bandpass filter 18→the frequency error detection circuit 22→the smoothing filter 24→the clock generation circuit 28→the bandpass filter 18.

In the first PLL, when the single-pattern gate signal GTS indicates any of the sections each with the VFO pattern, a control operation for causing the smoothing filter 24 to set a feedback gain to the phase error information PE1 is performed to bring a value shown by the phase error information PE1 closer to zero. In the second PLL, when the single-pattern gate signal GTS indicates the section other than the sections each with the VFO pattern, a control operation for causing the smoothing filter 24 to set a feedback gain to the phase error information PE2 is performed to bring a value shown by the phase error information PE2 closer to zero. In the frequency locked loop, a control operation for causing the smoothing filter 24 to set a feedback gain to the frequency error information FEI is performed to bring a value shown by the frequency error information FEI detected from the wobble binarized signal WBN closer to zero.

With the apparatus of FIG. 1, even when high-speed reproduction from the DVD-RAM disk 1 is performed and when high-speed recording in the DVD-RAM disk 1 is performed, signal processing can be performed using the reproduced clock RCK having a frequency which is one-half of the channel bit frequency. As a result, it is possible to implement a cost reduction resulting from a reduced circuit scale, a reduction in power consumption, and stabilization of phase locking.

Embodiment 2

Figure 11:
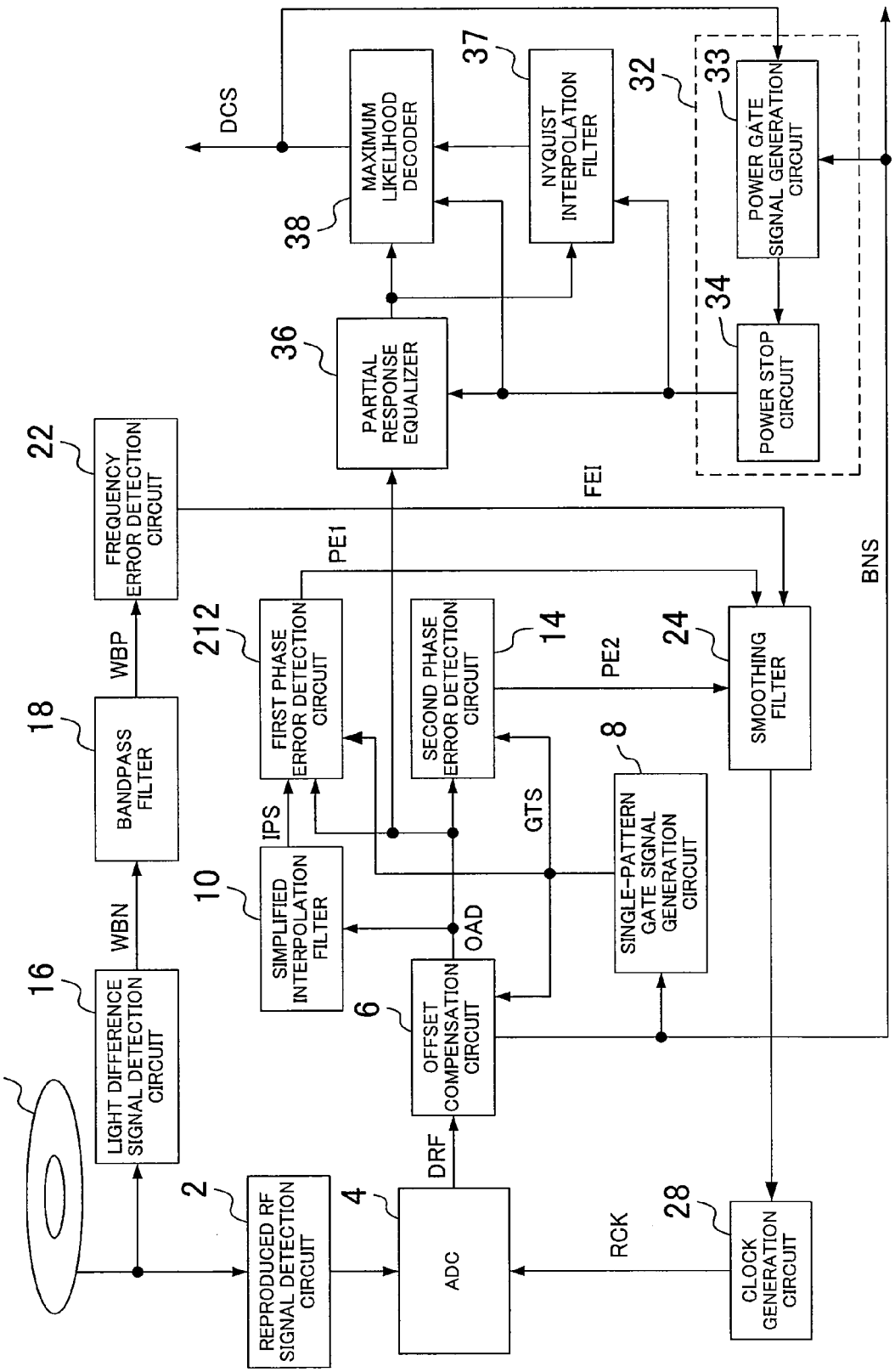
FIG. 11 is a block diagram showing a structure of a digital signal reproducing apparatus according to a second embodiment of the present invention.

FIG. 11 is a block diagram showing a structure of a digital signal reproducing apparatus according to the second embodiment of the present invention. The digital signal reproducing apparatus of FIG. 11 further includes a power control unit 32, a partial response equalizer 36, a Nyquist interpolation filter 37, and a maximum likelihood decoder (Viterbi decoder) 38 in addition to the components of the digital signal reproducing apparatus of FIG. 1, while including a first phase error detection circuit 212 instead of the first phase error detection circuit 12. The power control unit 32 has a power gate signal generation circuit 33 and a power stop circuit 34.

Figure 12:
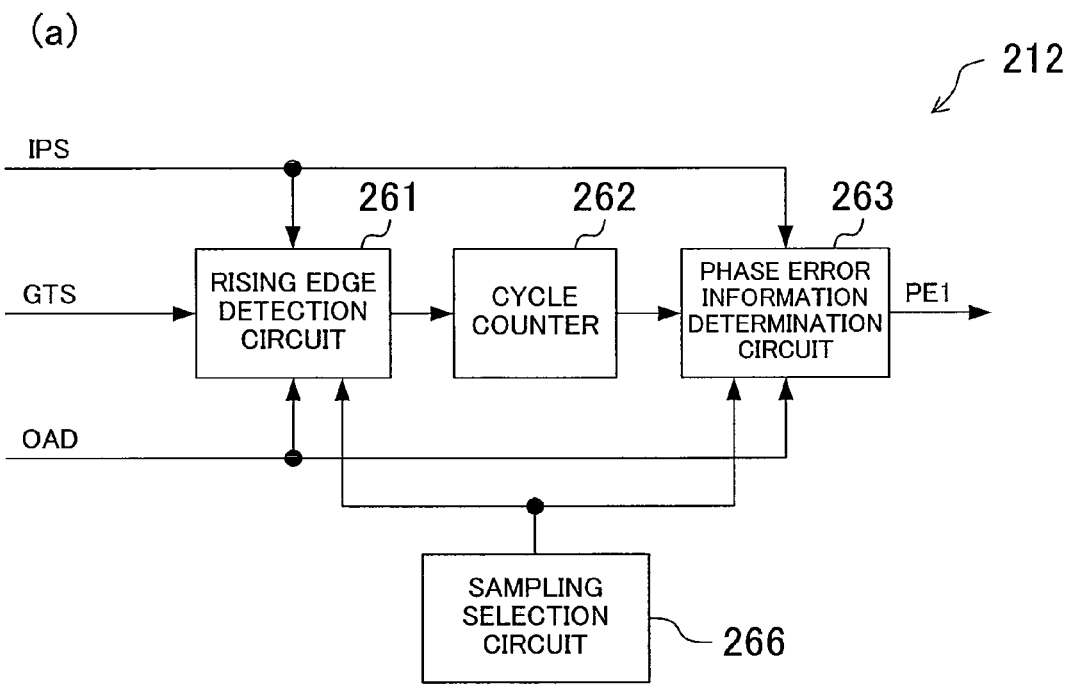
FIG. 12($a$) is a block diagram showing an example of a structure of the first phase error detection circuit of FIG. 11 and FIG. 12($b$) is view illustrating the principle of the detection of phase error information by the first phase error detection circuit of FIG. 12($a$).
Figure 12:
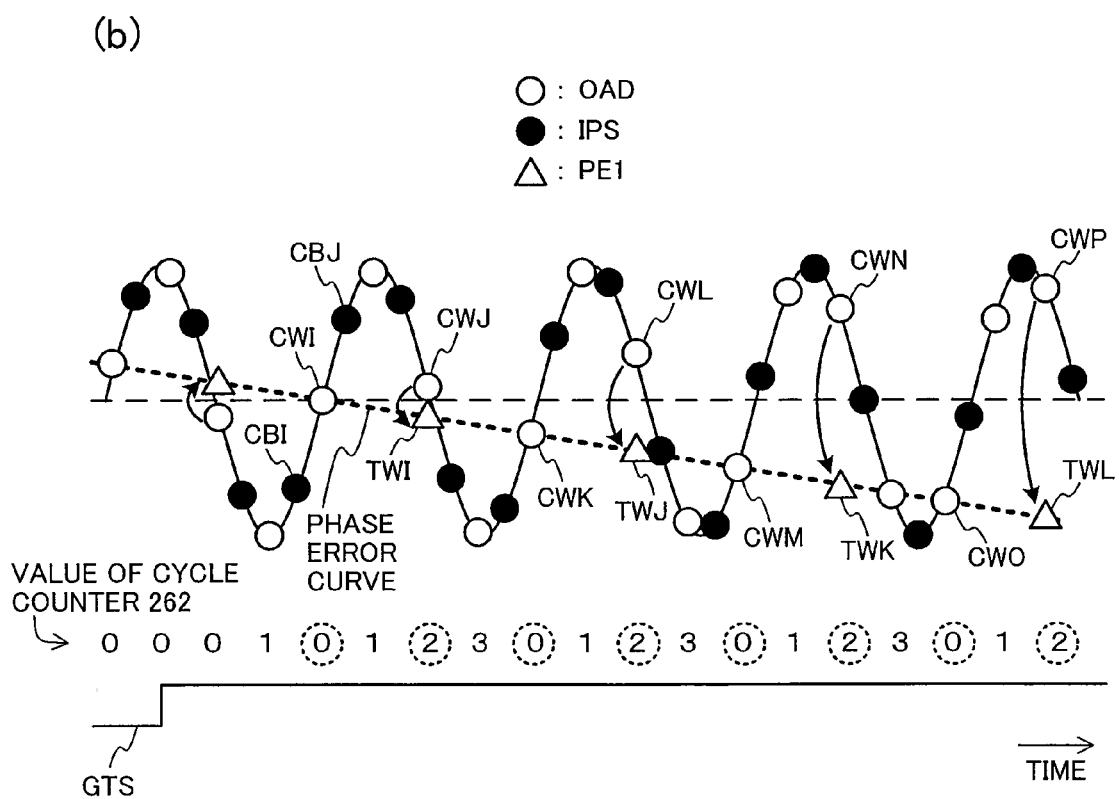

FIG. 12(a) is a block diagram showing an example of a structure of the first phase error detection circuit 212 of FIG. 11. FIG. 12(b) is view illustrating the principle of the detection of the phase error information PE1 by the first phase error detection circuit 212 of FIG. 12(a).

As shown in FIG. 12(a), the first phase error detection circuit 212 has a rising edge detection circuit 261 as a zero cross detector, a cycle counter 262, a phase error information determination circuit 263, and a sampling selection circuit 266. The sampling selection circuit 266 selects either of a first sampling method as described with reference to FIG. 8 in the first embodiment and a second sampling method, which will be described hereinbelow, and notifies the rising edge detection circuit 261 and the phase error information determination circuit 263 of the selected method. The second sampling method is a method which performs sampling at a position shifted in phase by 180 degrees from the position sampled in the first sampling method and is appropriate for a PRML (partial response maximum likelihood) signal processing method.

The rising edge detection circuit 61 receives the output signal IPS of the simplified interpolation filter 10 and the output signal OAD of the offset compensation circuit 6 and detects the zero cross position of a first rise when the single-pattern gate signal GTS indicates any of the sections each with the VFO pattern.

A description will be given herein by assuming that the second sampling method has been selected. In FIG. 12(b), the mid points between the points CWI and the like (represented by the white circles ○) indicating the values of the output signal OAD of the offset compensation circuit 6 and the points CBI and the like (represented by the black circles ●) indicating the values of the output signals IPS of the simplified interpolation filter 10 are arranged in a temporal order. The rising edge detection circuit 261 detects, from among these intermediate values arranged in the temporal order, the point at which a negative value becomes a positive value for the first time after the single-pattern gate signal GTS shifts to the high logic level, i.e., the zero cross position (point CWI) of the first rise.

The cycle counter 262 is reset to zero at the detected zero cross position, counts each pulse of the reproduced clock RCK, and circulates the counted value in the order of 0→1→2→3→0.

The phase error information determination circuit 263 outputs the output signal IPS of the simplified interpolation filter 10 as the phase error information PE1 with the timing with which the counted value of the cycle counter 262 is "0". In FIG. 12(b), the phase error information determination circuit 263 determines the points CWI, CWK, CWM, and CWO as points which should be located at the zero cross positions of the rises and outputs the points CWI, CWK, CWM, and CWO as the phase error information PE1.

The phase error information determination circuit 263 inverts the sign of the value of the output signal IPS of the simplified interpolation filter 10 with the timing with which the counted value of the cycle counter 262 is "2" and outputs the sign-inverted output signal IPS as the phase error information PE1. In FIG. 12(b), the phase error information determination circuit 263 determines the points CWJ, CWL, CWN, and CWP as points which should be located at the zero cross positions of the falls, inverts the signs of the respective values of these points, and outputs the sign-inverted points TWI, TWJ, TWK, and TWL (represented by the hollow triangles) as the phase error information PE1.

Although the description has been given to the case where the output signal OAD from the offset compensation circuit 6 is detected at the zero cross position of the first rise, when the output signal IPS of the simplified interpolation filter 10 is detected at the zero cross position of the first rise, the phase error information PE1 is generated from the output signal IPS of the simplified interpolation filter 10.

Since the sampling method can thus be switched with the sampling selection circuit 266, it is possible to support both of the PRML signal processing method which is said to be advantageous against noise and a non-linear distortion and a level slice method which simply performs binarization with a threshold value for performing quality determination for guaranteeing a recording quality. Because there is a case where the level slice method is advantageous against a defect caused by a physical flaw, a fingerprint, or the like in a recording medium, an improvement in reproduction performance can also be expected by selecting the sampling method appropriate for the quality of a read signal.

The partial response equalizer 36 gives intersymbol interference to the output signal OAD of the offset compensation circuit 6 and outputs the output signal OAD with the intersymbol interference. The partial response equalizer 36 uses, e.g., a PR (a, b, b, a) method in which the waveform amplitude after equalization has any of five values as the partial response method. The PR (a, b, b, a) method uses a value $(a+b*D+b*D^2+a*D^3)$ obtained by adding up sampled data of an input signal at four different times at a ratio of a:b:b:a and functions as a lowpass filter for the input signal.

FIG. 3 shows the frequency responses of a process according to a PR (1, 2, 2, 1) method and a PR (3, 4, 4, 3) method. Each of the methods is considered to be a more advantageous partial response method as the frequency response is closer to the MTF characteristics shown in FIG. 3. There are various types of partial responses other than the methods shown in FIG. 3 and the PR (a, b, b, a) method. However, any method can be used without causing a problem provided that needed performance is obtainable.

By using such a partial response method. which adds correlation in the time direction of reproduced data and the Viterbi decoder which estimates a most likely series by using the added correlation in combination, PRML signal processing which is said to be advantageous for high-density recording/reproduction in a linear recording direction is implemented. Because the PRML signal processing includes various methods, it is necessary to select proper methods for various recording/reproduction systems in accordance with the characteristics of reproduced waves and modulation codes.

The Nyquist interpolation filter 37 reconstructs missing information from the output signal of the partial response equalizer 36 and outputs the reconstructed information. The Nyquist interpolation filter 37 is, e.g., a finite impulse response filter having a filter coefficient for reconstructing a Nyquist band, as shown in FIG. 6. As a finite length is larger, the accuracy of Nyquist interpolation increases. However, it is also possible to reduce the influence of a truncation error due to the finite number of taps by using, e.g., a window function and reduce the circuit scale. The structure of the Nyquist interpolation filter 37 and the filter coefficient may also be other than those shown herein.

The maximum likelihood decoder 38 estimates a most likely series using intersymbol interference from output signals of the partial response equalizer 36 and the Nyquist interpolation filter 37 and outputs the result of the estimation as a demodulated signal DCS. The maximum likelihood decoder 38 is, e.g., a Viterbi decoder which calculates a probability in accordance with the type of the partial response used in the partial response equalizer 36 and with the rule of intentionally added correlation of symbols and estimates the most likely series. Since the structure of the Viterbi decoder is well known to those skilled in the art, a detailed description thereof will be omitted herein.

Not only the digital binarized signal BNS resulting from binarization using the threshold value but also the demodulated signal DCS as a result of demodulation performed by using the PRML signal processing method can be obtained. Therefore, even when high-frequency noise is large or the quality of a signal read during high-speed recording/reproduction is degraded, recording/reproduction performance can be improved.

To the partial response equalizer 36, the Nyquist interpolation filter 37, and the maximum likelihood decoder 38, the reproduced clock RCK is supplied. During recording in the DVD-RAM disk 1, the power gate signal generation circuit 33 predicts the position of the data portion DD based on the address information obtained from the digital binarized signal BNS or the demodulated signal DCS, generates the power gate signal indicating the period of the data portion DD (i.e., the section other than any of the sections each with the pattern), and outputs the power gate signal to the power stop circuit 34.

When the digital signal reproducing apparatus is in a state where recording is performed in the DVD-RAM disk 1 and the power gate signal indicates the period of the data portion DD, the power stop circuit 34 stops supplies of the reproduced clock RCK to the partial response equalizer 36, the Nyquist interpolation filter 37, and the maximum likelihood decoder 38. For example, the operation of the power stop circuit 34 becomes valid after the establishment of the state where recording in the DVD-RAM disk 1 is performed and the operation thereof becomes invalid immediately before the establishment of a state where reproduction from the DVD-RAM disk 1 is performed.

When software processing is high in speed and performance, the power control unit 32 may also perform direct power control of the partial response equalizer 36, the Nyquist interpolation filter 37, and the maximum likelihood decoder 38 during recording and reproduction performed with respect to the DVD-RAM disk 1.

Thus, during high-speed recording in the DVD-RAM disk 1, the apparatus of FIG. 11 makes it possible to improve the stability of address reproduction performance and the recording quality in the processing of the headers HA to HD in which the address information is recorded by generating the demodulated signal DCS in accordance with the PRML signal processing method, which is said to be advantageous against noise and a non-linear distortion, and easily reduce the power consumption of a circuit related to the PRML signal processing in the processing of the data portion DD. Since a control operation for reducing power consumption is easy, the operation of recording/reproducing digital data is also stabilized.

INDUSTRIAL APPLICABILITY

As described above, the present invention allows high-speed recording/reproduction to be performed with respect to a DVD-RAM disk with low power consumption, while retaining high reproduction performance, so that it is useful for a DVD-RAM disk drive, a DVD recorder using the DVD-RAM disk drive, a DVD multi-drive, or the like. Because the present invention is low in power consumption, it is particularly useful for a battery-operated apparatus such as a digital hand-held camcorder in which a DVD-RAM disk drive is mounted or a slim optical disk drive for a notebook personal computer.

The invention claimed is:

1. A digital signal reproducing apparatus comprising:
an analog to digital converter for sampling and quantizing a reproduced RF (Radio Frequency) signal read from an optical recording medium in which address information is intermittently recorded as embossed pits and a recording groove has a wobble in accordance with a reproduced clock having a frequency which is one-half of a channel bit frequency and outputting an obtained digital RF signal;
an offset compensation circuit for reducing an offset component in an amplitude direction from the digital RF signal and outputting the digital RF signal with the reduced offset component in the amplitude direction;
a simplified interpolation filter for reconstructing a signal indicating a predetermined pattern recorded in the optical recording medium from the output signal of the offset compensation circuit and outputting the reconstructed signal;
a first phase error detection circuit for obtaining a phase error in a section with the predetermined pattern in accordance with the output signal of the offset compensation circuit and an output signal of the simplified interpolation filter and outputting the phase error as first phase error information;

a second phase error detection circuit for obtaining a phase error in a section other than the section with the predetermined pattern in accordance with the output signal of the offset compensation circuit and outputting the phase error as second phase error information;

a smoothing filter for setting a feedback gain to each of respective values shown by the first phase error information and the second phase error information to reduce a magnitude of each of the values, obtaining a product of each of the values and the feedback gain corresponding thereto, smoothing a result, and outputting the smoothed result; and a clock generation circuit for generating the reproduced clock in accordance with the output signal of the smoothing filter.

2. The digital signal reproducing apparatus of claim 1, wherein the simplified interpolation filter is composed of a finite impulse response filter having four taps, wherein the finite impulse response filter weighs respective input signals to the four taps with (−0.25, 0.5, 0.5, and −0.25).

3. The digital signal reproducing apparatus of claim 1, wherein the first phase error detection circuit has:

a zero cross detector for obtaining values after zero crosses in the section with the predetermined pattern in accordance with the output signal of the offset compensation circuit and the output signal of the simplified interpolation filter;

a cycle counter which is reset when the value after each of the zero crosses is obtained to count the reproduced clock with a period which is an integral multiple of the number of bits in the predetermined pattern; and a phase error information determination circuit for obtaining respective values of points which should be located at zero cross positions in the output signal of the offset compensation circuit every time the cycle counter counts one-half of the number of the bits of the predetermined pattern, inverting signs of the values of every other ones of the points which should be located at the zero cross positions, and then outputting the obtained values as the first error information.

4. The digital signal reproducing apparatus of claim 3, wherein the zero cross detector and the phase error information determination circuit obtain values of the output signal of the offset compensation circuit as the values of the points which should be located at the zero cross positions.

5. The digital signal reproducing apparatus of claim 3, wherein the zero cross detector and the phase error information determination circuit obtain average values as the values of the points which should be located at the zero cross positions, each of the average values being an average between a value of the output signal of the offset compensation circuit and a value of the output signal of the simplified interpolation filter at a time shifted in time from the value of the output signal of the offset compensation circuit by one-half of a period of the reproduced clock.

6. The digital signal reproducing apparatus of claim 3, wherein the first phase error detection circuit further has:

a sampling selection circuit for selecting either of first and second sampling methods and notifying the zero cross detector and the phase error information determination circuit of the selected method, wherein the zero cross detector and the phase error information determination circuit obtain values of the output signal of the offset compensation circuit as the values of the points which should be located at the zero cross positions when the first sampling method is selected and obtain average values as the values of the points which should be located at the zero cross positions, each of the average values being an average between the value of the output signal of the offset compensation circuit and a value of the output signal of the simplified interpolation filter at a time shifted in time from the value of the output signal of the offset compensation circuit by one-half of a period of the reproduced clock when the second sampling method is selected.

7. The digital signal reproducing apparatus of claim 1, further comprising:

a bandpass filter for removing a noise component other than a frequency component of the wobble from a binarized signal indicating a tracking error based on light received from the optical recording medium and outputting the binarized signal from which the noise is removed; and a frequency error detection circuit for measuring a period of the output of the bandpass filter using the reproduced clock and outputting a difference between a result of the measurement and a result to be obtained as frequency error information, wherein the smoothing filter sets a feedback gain to a value shown by the frequency error information to reduce a magnitude of the value, obtaining a product of the value and the feedback gain corresponding thereto, smoothing a result, and outputting the smoothed result.

8. The digital signal reproducing apparatus of claim 7, wherein the bandpass filter has:

a moving average filter for performing a process with respect to the binarized signal; and a binarization circuit for binarizing an output of the moving average filter and outputting the binarized output, wherein the moving average filter has delay elements in a predetermined number of stages, each for delaying a signal inputted thereto by a period of the reproduced clock.

9. The digital signal reproducing apparatus of claim 8, wherein the bandpass filter further has:

a lowpass filter for performing a process with respect to the binarized signal and outputting a result of the process to the moving average filter, wherein the lowpass filter has:

a D flip-flop for receiving the binarized signal and operating in accordance with a clock having a frequency which is double the frequency of the reproduced clock; and an adder for adding up the binarized signal and an output of the D flip-flop.

10. The digital signal reproducing apparatus of claim 1, further comprising:

a partial response equalizer for giving predetermined intersymbol interference to the output signal of the offset compensation circuit and outputting the obtained signal;

a Nyquist interpolation filter for reconstructing a value of the output signal of the partial response equalizer at a time when sampling is not performed and outputting the reconstructed value; and a maximum likelihood decoder for estimating a most likely series in accordance with the output signal of the partial response equalizer and the output of the Nyquist interpolation filter and outputting the estimated most likely series.

11. The digital signal reproducing apparatus of claim 10, further comprising:

a power control unit for stopping supplies of the reproduced clock to the partial response equalizer, to the Nyquist interpolation filter, and to the maximum likelihood decoder in the section other than the section with the predetermined pattern when data is recorded in the optical recording medium.

12. The digital signal reproducing apparatus of claim 11, wherein the power control unit has:

a power gate signal generation circuit for generating a power gate signal indicating the section other than the section with the predetermined pattern and outputting the power gate signal; and a power stop circuit for stopping the supplies of the reproduced clock to the partial response equalizer, to the Nyquist interpolation filter, and to the maximum likelihood decoder when the power gate signal indicates the section other than the section with the predetermined pattern, wherein the power stop circuit has an operation thereof which becomes valid after the digital signal reproducing apparatus shifts to a state where recording in the optical recording medium is performed and which becomes invalid immediately before the digital signal reproducing apparatus shifts to a state where reproduction from the optical recording medium is performed.

* * * * *